United States Patent [19]

Fowler

[11] 4,350,346
[45] Sep. 21, 1982

[54] HEAT RESISTANT SEAL

[75] Inventor: John H. Fowler, Houston, Tex.

[73] Assignee: Smith International, Inc., Newport Beach, Calif.

[21] Appl. No.: 248,507

[22] Filed: Mar. 27, 1981

[51] Int. Cl.³ .............................................. F16J 15/12
[52] U.S. Cl. .................................... 277/26; 277/116.2; 277/117; 277/124; 277/125; 277/188 A; 277/200; 277/213; 277/DIG. 6
[58] Field of Search .................... 277/26, 116.2, 116.8, 277/117-122, 123-125, 188 A, 190, 191, 200, 208, 213, DIG. 6

[56] References Cited

U.S. PATENT DOCUMENTS

| | | | |
|---|---|---|---|
| 1,594,517 | 8/1926 | Dufty | 277/125 X |
| 3,403,917 | 10/1968 | MacSpadden | 277/200 X |
| 3,433,506 | 3/1969 | Crowe | 277/26 X |
| 3,531,236 | 9/1970 | Braddick et al. | 277/124 X |
| 3,810,639 | 5/1974 | Scannell | 277/117 X |
| 4,068,853 | 1/1978 | Schnitzler | 277/DIG. 6 X |
| 4,116,451 | 9/1978 | Nixon et al. | 277/124 X |
| 4,160,551 | 7/1979 | Nixon et al. | 277/DIG. 6 X |
| 4,190,257 | 2/1980 | Schnitzler | 277/DIG. 6 X |

FOREIGN PATENT DOCUMENTS

| | | | |
|---|---|---|---|
| 242687 | 10/1946 | Switzerland | 277/125 |
| 511528 | 8/1939 | United Kingdom | 277/213 |

Primary Examiner—Robert S. Ward, Jr.
Attorney, Agent, or Firm—Ned L. Conley; David Alan Rose; William E. Shull

[57] ABSTRACT

A fire-resistant seal for maintaining sealing contact between the sealing surfaces within a packing box under high temperature differentials between the inner and the outer members of such packing box, comprising one or more graphite-component seal rings for engaging the sealing surfaces of the inner and outer members, metal seal rings above and below the graphite-component seals for preventing extrusion of the graphite-component seal rings as well as for establishing metal-to-metal sealing contact between said metal rings and the sealing surfaces of the inner and outer members, and load maintaining means in the form of a metal crushable follower of cylindrical shape, having recessed grooves along its outer and inner perimeters, the gap between said grooves being permanently narrowed to approximately half-closure after applying a predetermined make-up load greater than the rated working pressure, which enables said crushable follower to maintain such compressive load on said graphite-component seals over a predetermined load range.

35 Claims, 7 Drawing Figures

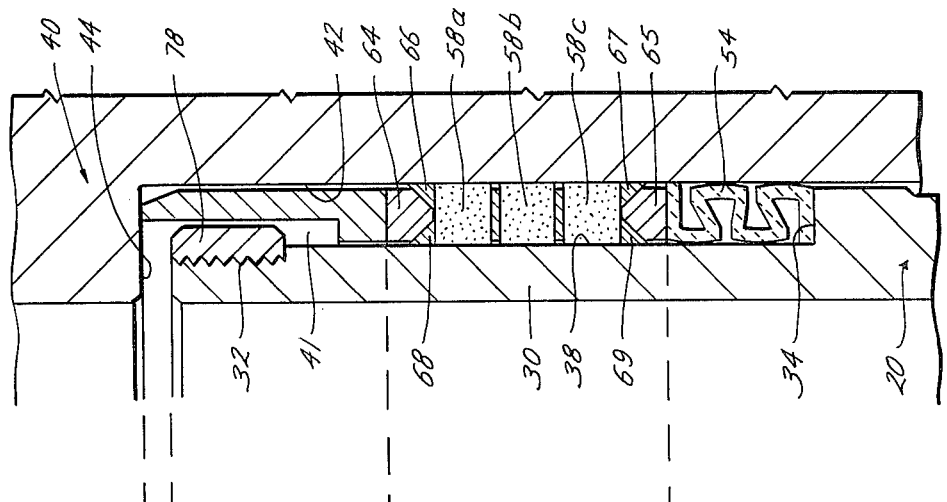
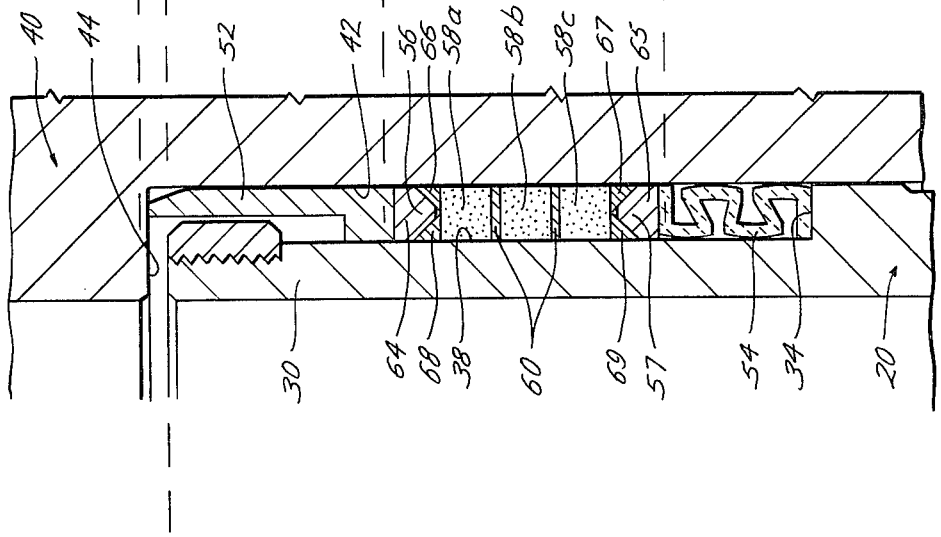
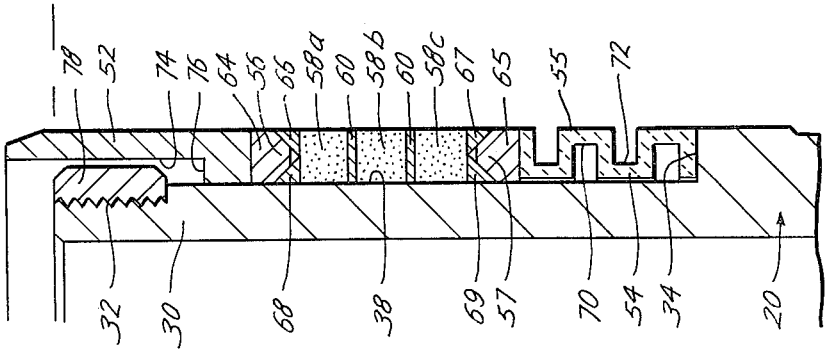

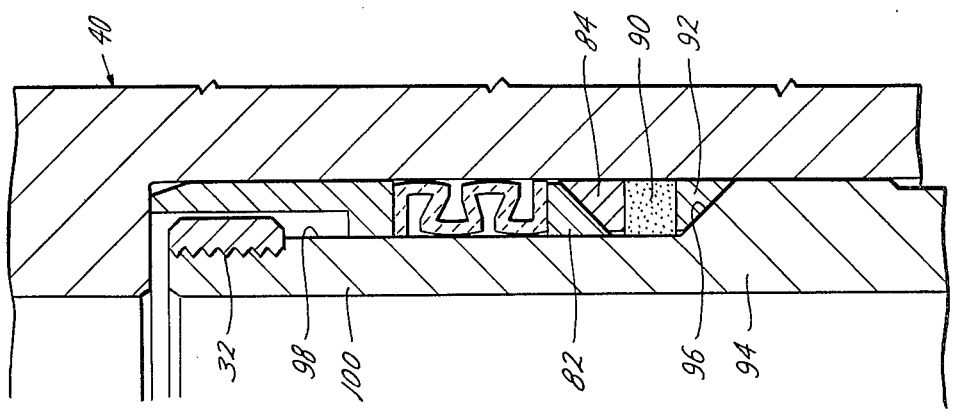
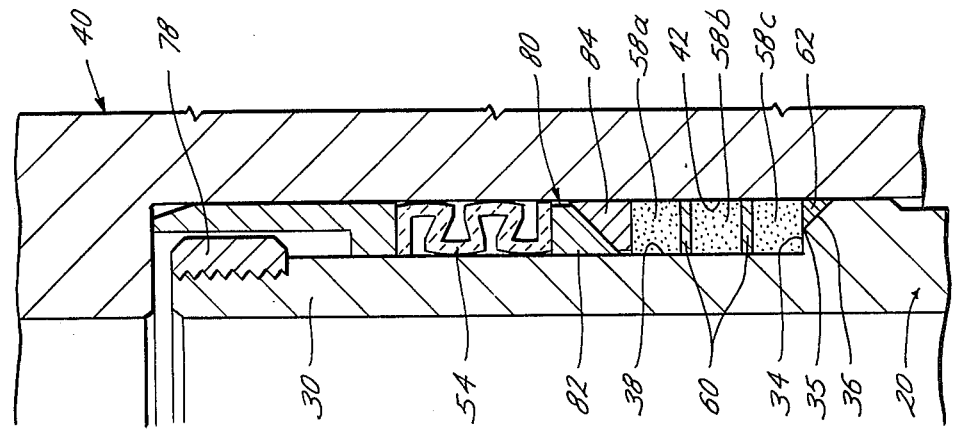
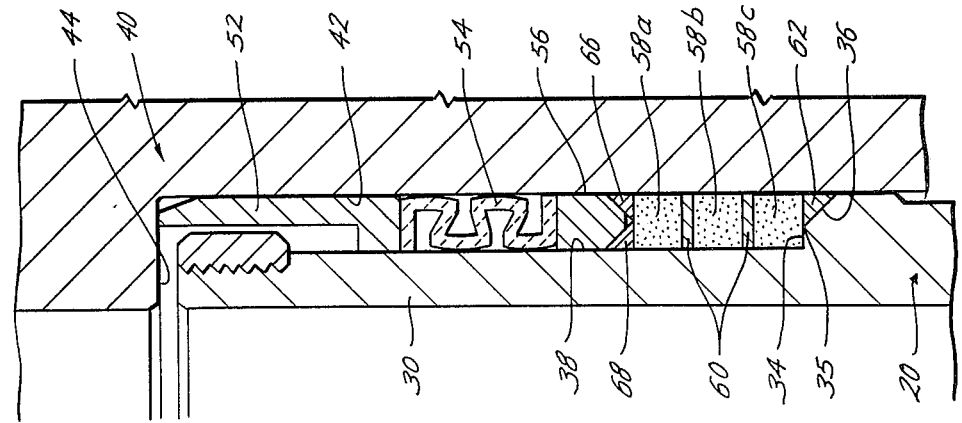

HEAT RESISTANT SEAL

TECHNICAL FIELD

This invention relates to seals and more particularly to seals capable of maintaining a fluid tight seal upon the application of high temperatures to the exterior of a connection as when subjected to high flame temperature.

BACKGROUND ART

In many industrial environments, fire is a constant and almost unavoidable hazard. This is particularly true of the oil and gas industry. Where highly flammable liquids are being handled under high pressures, it is vitally important that, once a local outbreak of a fire does occur, all internal packing elements maintain pressure tight seals lest a local mishap assume uncontrollable proportions.

A wide variety of packing elements designed to maintain a pressure differential between telescoping parts in a connection are generally known in the art. Such materials are most commonly selected, however, on the basis of such features or properties as compressibility, elasticity, chemical resistivity, and lubricity. Some of the most common packing materials, such as gasket paper, cork composition, or sheet rubber are strictly limited in their application to low temperature environments. A number of special, high temperature resistant packing materials are known in the art, as for example, asbestos which is widely used in the form of asbestos mats or sheets or as filling material between corrugated sheet metal, metal jackets or spirally wound steel strips. Even though these materials or combinations of materials do not burn, char, or disintegrate under high temperature conditions, maintaining a pressure tight seal using such materials under such conditions still presents a difficult engineering problem. In most cases, a sizable temperature differential exists between the two surfaces that are to be sealed, especially where high temperatures are locally confined and intermittent in nature, e.g., where a fire breaks out within or around the telescoping machine elements containing the packing between them. Frequently, the material dimensions of the elements joined or separated by the seal are quite different and will therefore result in different equilibrium temperatures after heating. In addition, even when temperature equilibrium is maintained across the interface, different materials employed side by side will undergo different thermal expansions and thereby cause leakage or loss of sealing effect. If, for example, the outer element is both longer in axial dimension and hotter in temperature, its greater axial expansion tends to relieve any load which had been supplied by it to actuate the seal, thereby permitting leakage to result. The differing radial expansion between the (hotter) outer element and the (cooler) inner member will also result in a radial gap which destroys the seal or permits it to extrude into the gap. Since prior art packings have generally employed packing materials of thermal expansion coefficients substantially different from those most commonly used for the stuffing box, e.g., steel, both types of sealing breakdowns are experienced under high temperature differential conditions. It would, therefore, be desirable to employ a packing material having a thermal expansion coefficient such that it will expand approximately as fast as, or slightly faster than, the elements to be sealed when the elements are exposed to a high temperature environment. It would also be desirable to employ an applicator which prevents extrusion of the packing material while maintaining a fairly constant sealing load upon the packing material and which applies a load greater than the fluid pressure being sealed off between the elements.

Graphite has long been known to have some of the properties generally desired for high temperature packing materials. It must, however, frequently be combined with other materials, which, in turn, negatively influence the thermal properties before its mechanical properties can satisfy the design demands of high pressure seals. One of the substances not sharing this common shortcoming is "Grafoil" described in the publications "Grafoil—Ribbon-Pack, Universal Flexible Graphite Packing for Pumps and Valves" by F. W. Russell (Precision Products) Ltd. of Great Runmow, Essex, England, and "Grafoil Brand Packing" by Crane Packing Company of Morton Grove, Ill. and incorporated herein by reference.

Grafoil is an all-graphite packing material manufactured by DuPont containing no resin binders or inorganic fillers. It has the chemical inertness and lubricity typical of pure graphite but, unlike conventional graphite, has highly directional values for thermal conductivity, thermal expansion, and electrical resistivity. Grafoil is a material which will withstand extreme temperatures over 2000° F., is self-lubricating, will not vulcanize or bond to metal surfaces, exhibits no embrittlement and possesses high thermal conductivity. Its highly directional thermal properties can be readily controlled by the manner in which the material is wrapped. A loose wrap produces packing having the highest thermal expansion in the axial direction. A tight wrap produces the reverse, i.e., highest thermal conductivity axially, and highest thermal expansion radially. A medium wrap will exhibit nearly isotropic thermal conductivity and expansion.

Grafoil has been used in various applications, many of which are described in the above Grafoil publications. Grafoil packing has been used in fire safe controls because the packing will not deteriorate under high temperatures and sealing is maintained after cool down. Grafoil has also successfully been employed in boiler feed pumps, centrifugal, reciprocating and rotary pumps, and for valve stems. It has, however, been limited in application since Grafoil is susceptible to extrusion.

In the oil and gas industry, where extremely high downhole pressures are encountered and must be sealed against, no successful mechanical combination of packing materials has been found which would permit the thermally desirable properties of graphite to be employed under the necessary high pressure conditions. These deficiencies in the prior art are overcome by the present invention.

SUMMARY OF THE INVENTION

A wellhead assembly includes a wellhead supporting a hanger suspending a string of casing into the well. The head has an adapter telescoping a nipple on the hanger and between the adapter and nipple is employed a packing to seal the outer surface of the nipple and the inner surface of the adapter. If the wellhead and adapter are exposed to excessive heat, their radial thermal expansion will widen the gap between the inner and outer sealing surfaces and their axial expansion will relieve the packing pressure necessary to maintain sealing contact. The packing of the present invention is designed to maintain sealing contact between these two surfaces even after the application of extreme temperature differentials between them, such as commonly occurs when a fire breaks out.

A fire-resistant seal is composed of three main elements: one or more packing rings, one or more antiextrusion rings and a crushable follower. A reduced diameter portion forming the upper part of the nipple defines a space between the nipple and the inner wall of the adapter within which the seal is housed. The main sealing element employed is a packing ring or a series of packing rings made of a graphite compound and separated by metal spacer rings. The wrap of the graphite compound is dependent upon the application. The looser the wrap, the greater the radial thermal conductivity. The tighter the wrap, the greater the radial expansion. The present invention generally employs a medium wrap.

Wedge assemblies abut each side of the cross-sectional surfaces of the packing ring to prevent extrusion since a graphite compound has little strength of its own. One or both of the wedge assemblies include back-up rings which expand radially inwardly and outwardly upon the application of a downwardly load on the wedge assembly.

One wedge assembly has a flat baseline surface against which a crushable follower maintains a predetermined load. The crushable follower consist of an elongated cylindrical ring whose alternating series of inner and outer grooves gives it a meander-like cross-section. The crushable follower eliminates the need for close vertical tolerances and acts like a one time spring. Its nonreversible resiliency generally maintains the applied load without giving way under higher downhole pressures.

Upon assembly, the fire-resistant seal is compressed with the crushable follower contracting to proper dimensions with the load range being chosen such that the groove becomes compressed to approximately one-half its preassembled width. This compression causes the compressed packing to establish a seal between the outer surface of the nipple and inner surface of the adapter and actuates the wedge assemblies to cam the back-up rings into a metal-to-metal sealing engagement between the back-up rings and the sealing surfaces above and below the packing. When the wellhead becomes exposed to fire and causes the adapter to expand axially and radially, the graphite compound, having an expansion coefficient comparable to the adapter, will also expand to maintain contact with the surfaces and the back-up rings. The back-up rings will maintain metal-to-metal contact with the sealing surfaces and restrain graphite compound extrusion as the graphite compound expands to maintain sealing contact. The upper and lower back-up rings thus prevent extrusion of the graphite compound ring while at the same time creating metal-to-metal seals against both upward and downward pressures. Other objects and advantages of the invention will appear from the following description.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 2 is an enlarged cross-sectional view of the packing assembly shown in FIG. 1 in the nonengaged condition;

FIG. 3 is a cross-sectional view of the packing assembly shown in FIG. 2 in the engaged condition;

FIG. 4 is a cross-sectional view of the packing assembly shown in FIG. 3 upon the application of high external heat;

FIG. 5 is a cross-sectional view of a second embodiment of the packing assembly of the present invention;

FIG. 6 is a cross-sectional view of a third embodiment of the packing assembly of the present invention; and FIG. 7 is a cross-sectional view of a fourth embodiment of the packing assembly of the present invention.

DESCRIPTION OF THE PREFERRED EMBODIMENT

Figure 1:
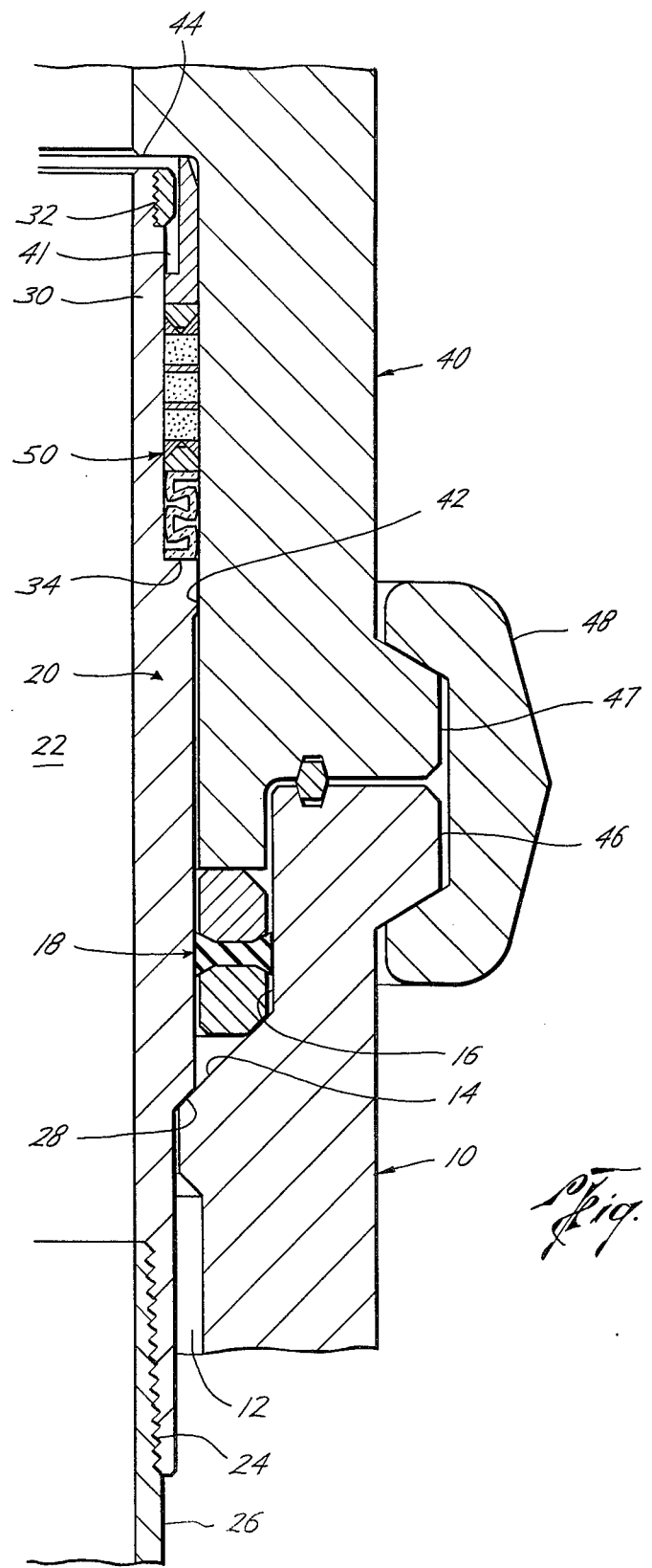
FIG. 1 is a cross-sectional view of a first embodiment of the packing assembly of the present invention shown installed in a typical environment such as the top section of a nipple.

Referring now to FIG. 1, there is shown a typical installation of the present invention. It should be understood that the following illustrative environment is for descriptive purposes only and that the invention has other applications not hereinafter described. The illustrative environment includes a wellhead 10 having a tapered seat 14 projecting into the wellhead bore. Nipple 20 includes a central flow passage 22, a lower threaded box 24 for suspending a string of tubing or casing 26, and a downwardly facing frustoconical shoulder 28 for supporting engagement with wellhead seat 14 upon the lowering of nipple 20 and string 26 into the well. Upon installation of string 26, string 26 forms an annulus 12 extending down into the well.

Nipple 20 further includes a reduced diameter portion 30 at its upper end for telescopically receiving packing assembly 50. Reduced diameter portion 30 includes external threads 32 at its upper end and forms an upwardly facing shoulder 34 for supporting packing assembly 50.

Upon landing nipple 20 within wellhead 10, an adapter 40 is telescopically received over reduced diameter portion 30 projecting from wellhead 10. Adapter 40 has a counterbore 42 forming a downwardly facing annular shoulder 44 which approaches but does not engage the upper end of nipple 20.

Wellhead 10 has a counterbore 16 above seat 14 for receiving a seal assembly 18 telescopically received over nipple 20 for sealing between nipple 20 and wellhead 10 upon make up. Wellhead 10 and adapter 40 have mating annular partially recessed and protruding flanges 46, 47, respectively, connected together by clamps 48.

Referring now to FIG. 2, packing assembly 50 of the present invention is shown in greater detail. Packing assembly 50 includes a tubular spacer ring 52, an upper expansible wedge assembly 56, a plurality of packing rings 58a, 58b, and 58c having spacer rings 60 therebetween, a lower expansible wedge assembly 57, and a crushable follower 54. Starting with crushable follower 54, packing assembly 50 is received over the upper end of reduced diameter portion 30 of nipple 20 with crushable follower 54 engaging shoulder 34.

Crushable follower 54 consists of an elongated cylindrical ring whose radial width is approximately equal to that of lower wedge assembly 57 and packing rings 58. Along the outer and inner surfaces of crushable follower 54, however, are cut generally rectangular grooves 70 on the inside and, in alternating step fashion, similar grooves 72 along the outside wall of follower 54. Grooves 70, 72 permit follower 54 to be compressed in a vertical direction whereby the vertical ridges 55 formed by grooves 70, 72, respectively, bend, at a predetermined compressive load.

Upper expansible wedge assembly 56 includes wedge ring 64 and outer and inner metal rings 66, 68. Lower expansible wedge assembly 57 includes a wedge ring 65 and outer and inner metal rings 67, 69. Rings 66, 68 abut the upper annular surface of packing ring 58a with inner 68 adjacent axial wall 38 and outer ring 66 adjacent counterbore 42 of adapter 40 upon assembly. Rings 66, 68 have generally triangular cross-sections forming a V-shape upon assembly and have their facing annular corners truncated so as to form abutting vertical surfaces. Wedge ring 64 has a lower generally wedge-shaped, trapezoidal cross-section for mating engagement with the upwardly facing surfaces of rings 66, 68, forming the V. Wedge ring 65 and outer and inner metal rings 67, 69 have cross-sections comparable to those of wedge ring 64 and rings 66, 68. However, wedge ring 65 and rings 67, 69 form an inverted V-shape upon assembly. Thus, the lower annular side of wedge ring 65 engages the upper surface of crushable follower 54 and the upper annular side formed by wedge ring 65 and rings 67, 69 engages the lower annular surface of packing ring 58c. These cooperating surfaces of upper and lower wedge assemblies 56, 57 form cam surfaces for actuation as hereinafter described.

Each packing 58 is a graphite compound, such as Grafoil, consisting principally of graphite combined with nonresin binders, which is commercially available in filament or wrap form. Such graphite seal means combines the desirable thermal and chemical characteritics of graphite with the added mechanical characteristics of its nonresin binder. In one size of seal assembly, each packing ring 58 consists of 15 wraps of 0.75 inch graphite compound ribbon, and is initially of generally square cross-section. Such graphite compound rings are compressed to a tightly wound filament bundle in a die prior to assembly by applying a make-up pressure which is higher than, e.g., approximately 20 percent more than, the rated working pressure of the valve. For a 5,000 psi rated valve the make-up pressure is 8,300 psi which is sufficient to compress a 0.75 inch ribbon to 0.31 inch height.

Grafoil is an all-graphite packing material manufactured by DuPont containing no resin binders or inorganic fillers. It has the chemical inertness and lubricity typical of pure graphite but, unlike conventional graphite, has highly directional values for thermal conductivity, thermal expansion, and electrical resistivity. Grafoil is a material which will withstand extreme temperatures over 2000° F., is self-lubricating, will not vulcanize or bond to metal surfaces, exhibits no embrittlement and possesses high thermal conductivity. Its highly directional thermal properties can be readily controlled by the manner in which the material is wrapped. A loose wrap produces packing having the highest thermal expansion in the axial direction. A tight wrap produces the reverse, i.e., highest thermal conductivity axially, and highest thermal expansion radially. A medium wrap will exhibit nearly isotropic thermal conductivity and expansion. Since the packing of the present invention must adapt to possible loss of sealing contact due to axial as well as radial thermal expansion of wellhead members, a medium wrap of the graphite compound packing is generally preferred because of its nearly isotropic expansion properties.

There are three such packing rings 58a, 58b, 58c, respectively, in this particular embodiment of the present invention. Packing rings 58a, 58b and packing rings 58b, 58c are separated from one another by metal spacer rings 60 for evenly distributing the deflection of packing rings 58 under high pressures and temperatures. Spacer rings 60 prevent any caking of adjacent graphite compound rings. As later described with respect to another embodiment used under medium or low load conditions, the packing of the present invention has also been used without such spacer rings between abutting packing rings since caking conditions exist under extreme pressures and temperatures encountered primarily in the larger diameter seals.

Cylindrical spacer ring 52, in combination with crushable follower 54, eliminates the need for close tolerances along the vertical direction of the neck formed by reduced diameter portion 30. Spacer ring 52 has a counterbore 74 forming a stop shoulder 76. A gland 78 is received by counterbore 74 for threaded engagement with threads 32 of reduced diameter portion 30. Gland 78 acts as a retainer ring, restraining the upward movement of packing assembly 50 by engaging stop shoulder 76 of spacer ring 52. Thus, gland 78 and spacer ring 52 prevent assembly 50 from slipping off of nipple 20 when nipple 20 is unassembled.

Referring now to FIG. 3 showing the assembled position, the packing assembly 50 of FIG. 2 is shown in its sealing or compressed stage under normal temperatures and working conditions. Adapter 40 is telescoped over nipple 20 and clamped onto wellhead 10 by clamp 48 as shown in FIG. 1. The upper terminal end of spacer ring 52 thereupon engages shoulder 44 of adapter 40, thereby causing a downward movement of spacer ring 52 to actuate and compress the packing assembly 50.

Initially upon actuation, crushable follower 54 engages shoulder 34 causing lower wedge ring 65 to cam upward along the inverted V surface formed by rings 67, 69, thereby expanding the latter into metal-to-metal engagement with counterbore 42 and axial wall 38, respectively. Packing rings 58 are compressed between upper and lower expansible wedge assemblies 56, 57 with spacer rings 60 therebetween for stiffening and radial guidance. Packing rings 58 are flattened, thereby increasing their radial thickness and causing sealing engagement with axial wall 38 on the inside and counterbore 42 on the outside. Wedge ring 64 is forced downwardly between rings 66, 68 camming outer ring 66 into metal-to-metal engagement with counterbore 42 and camming inner ring 68 into metal-to-metal engagement with axial wall 38. Upper rings 66, 68 and lower rings 67, 69 are also antiextrusion rings and prohibit the extrusion of the graphite compound along axial wal 38 and counterbore 42.

Upon wedge assembly 56, packing rings 58, and wedge assembly 57 reaching their actuation height, spacer ring 52 is depressed further until almost flush with the upper end of nipple 20 thereby further depressing and crushing follower 54 as shown in FIG. 3. The load characteristics of crushable follower 54 are such that a constant compressive force is maintained over a wide deflection range.

Crushable follower 54 is made of a relatively ductile material such as carbon steel or austenitic stainless steel. The mechanical properties of its material and its design with a step fashion annular groove arrangement combine to produce a load deflection curve which is nearly constant over a fairly wide range of elastic deformation, such as, for example, between 0.08" and 0.20" compression. For the environment of the present invention, the make-up load for the follower is chosen such that it remains well above the pressure load on the packing exerted by the downhole pressure. Without the effect of the extreme temperature differential, the make-up pressure is designed to permanently close the annular grooves to approximately one-half closure. For a nominal 5,000 psi rating (cold), the follower make-up loads are 50 tons for a 6" seal and 20 tons for the smaller 3" seal, equivalent to a pressure of approximately 8,300 psi. For other ratings throughout the range of commonly encountered rated working pressures, i.e., 2,000-15,000 psi, different values would be used, of course, so long as the previously stated conditions are met that the make-up pressure must be higher than the rated working pressure. The radial dimensions of crushable follower 54 are chosen such that in its partially crushed state the radial displacement caused by the bending of vertical ridges 55 will result in the midsections of vertical 55 touching but not scoring sealing surfaces 38 and 42.

Prior to describing FIG. 4 showing the environment 50 under high temperature, reference is made again to FIG. 1, illustrating the environment of the present invention. The telescoping connection of reduced diameter portion 30 of nipple 20 and counterbore 42 of adapter 40 forms a cylindrical chamber 41. The axial wall 38 of portion forms the inner sealing surface of chamber 41 and counterbore 42 forms the outer sealing surface. Upwardly facing shoulder 34 of nipple 20 and downwardly facing shoulder 44 of adapter 40 form the lower and upper ends of chamber 41.

The radial gap or thickness of chamber 41 is the difference between the outer diameter of reduced diameter portion 30 and the inner diameter of counterbore 42. The axial height or length of chamber 41 is the distnce between shoulders 34 and 44. The radial gap and axial height of chamber 41 will vary with the temperature of nipple 20 and adapter 40. Packing assembly 50 housed within chamber 41 must maintain a seal across the radial gap of chamber 41 regardless of the temperature of nipple 20 and adapter 40, especially when adapter 40 is subjected to the extreme heat of a fire around wellhead 10.

After assembly and actuation as described, packing assembly 50 provides both a metal-to-metal seal and a graphite seal across the radial gap between axial wall 38 and counterbore 42. Wedge assemblies 56, 57 have a dual role, providing metal-to-metal seals across the radial gap and forming antiextrusion rings for packing rings 58. Packing rings 58 provide a nonmetal seal across the radial gap. The assembly and actuation of wedge assemblies 56, 57 and packing rings 58 will cause such sealing engagement across the radial gap under normal temperatures and conditions.

To maintain this seal across the radial gap, packing assembly 50 must fill the radial gap and remain in sealing engagement with axial wall 38 and counterbore 42 even as the dimensions of chamber 41 change under fire conditions and must particularly expand as the radial gap of chamber 41 enlarges due to the thermal expansion of adapter 40. At the same time, wedge assemblies 56, 57 must increase their camming expansion to prevent the extrusion of the graphite compound along wall 38 and counterbore 42 as the axial height of chamber 41 increases due to the thermal expansion of adapter 40.

As can be seen in FIG. 1, the axial distance between support shoulder 28 and the upper end of nipple 20 is much greater than the radial wall thickness of adapter 40. Therefore, if adapter 40 and wellhead 10 become engulfed by fire, the thermal expansion of adapter 40 will, even if proportionally uniform, result, in absolute terms, in a greater axial elongation than radial expansion. Since nipple 20 is not only further removed and shielded from such fire but is also cooled by the flow of liquid through flow passage 22, the thermal expansion between adapter 40 and nipple 20 will tend to move the two apart and, through their differing elongations, cause the packing pressure upon packing assembly 50 to be relieved, resulting in loss of sealing contact with surfaces 38, 42. In addition, as described above, the differing radial expansions of nipple 20 and adapter 40 will also widen the radial gap between surfaces 38 and 42. It is these problems which the present invention is designed to prevent.

To that end, graphite compound is preferred as the nonmetal seal means, having a thermal expansion coefficient which is substantially the same as, or even directionally greater than, the expansion coefficient of the metal most commonly used for the hanger and nipple of the wellhead equipment of the present environment.

Referring now to FIG. 4, the high temperature application of packing assembly 50 of the present invention is depicted in a somewhat schematic fashion. Adapter 40, having expanded more than the relatively cooler nipple 20, has caused shoulder 44 of adapter 40 to become vertically upwardly displaced with respect to the upper end of nipple 20 thus increasing the axial height of chamber 41. Packing rings 58 are shown as having partially counterbalanced this expansion differential by their own axial expansion. In combination therewith, the thermal expansion of crushable follower 54 remaining well within the constant portion of the load deflection curve helps to maintain an approximately constant compression load under expanded conditions sufficient to maintain a seal against the maximum design downhole pressure.

Antiextrusion rings 66, 68 and 67, 69 are shown as having been displaced vertically upwardly and downwardly, respectively, by the expanding packing rings 58, and radially outwardly and inwardly, such movement being facilitated by the triangularly sloped cam surfaces of wedge rings 64, 65 between them. In this fashion, again, axial extrusion of packing rings 58 is prevented and radial metal-to-metal contact maintained with both counterbore 42 and axial wall 38 by rings 66, 68 and 67, 69. Thus, both counterbore 42 of adapter 40 and axial wall 38 of nipple 20 remain sealingly engaged by packing rings 58 and by back-up rings 66, 68, and 67, 69 as the thermal expansion of crushable follower 54, and the even greater axial expansion of packing rings 58, functionally cooperate to maintain the preselected compression load within a range sufficient to prevent leakage under downhole pressure.

The functional cooperation between the main elements of the fire-resistant packing assembly of the present invention has so far been described primarily with respect to one particular embodiment, having three packing rings 58 disposed between wedge assemblies 56, 57, each having two antiextrusion rings 66, 68 and 67, 69, respectively, wedge rings 64, 65, respectively. The two main advantages of this embodiment of the invention are that the crushable follower 54 need not withstand the higher test pressure which is applied from under the seal when the wellhead is assembled and that the crushable follower 54 is not exposed to potentially corrosive well fluid. As can be seen from FIGS. 5, 6 and 7, various other embodiments may be employed for differing wellhead sizes or downhole pressures.

Referring now to FIG. 5, a second embodiment of the present invention is illustrated and is identical with the first embodiment except for a different design in the wedge assembly and the positioning of the crushable follower. Crushable follower 54 is now positioned directly below spacer ring 52 and above upper expansible wedge assembly 56, which is the only such wedge assembly used in this embodiment of the present invention. The lower expansible wedge assembly shown in the first embodiment is replaced with a lower metal back-up ring 62. Packing rings 58 and metal spacer rings 60 are also identical in design, size and function to the arrangement previously described in connection with the description of FIGS. 1-4. Packing supporting shoulder 34 formed by the reduced diameter portion 30 of nipple 20, however, is provided with frustoconical seat 36 at its outer periphery for engagement with lower metal back-up ring 62.

Frustoconical seat 36 is slanted downwardly and outwardly from the axial wall 38 of reduced diameter portion 30 starting at shoulder 35 at an angle of generally 45°. Lower back-up ring 62 has a triangular shaped cross-section with its lower bevelled side resting against frustoconical seat 36. Ring 62 both acts as an antiextrusion device for packing ring 58c above it and establishes a metal-to-metal sealing contact with the interior surface of counterbore 42 of adapter 40. In the unassembled position, the upper leg of triangular lower back-up ring 62 abuts lower packing ring 58c.

Under load and high temperature conditions, triangular antiextrusion ring 62 will move downwardly under the pressure exerted by the expanding packing ring 58c. Because of its conical, triangular cross-section, ring 62 is able to slide radially outwardly and down frustoconical seat 36. Ring 62 is thus still in a position to prevent axial extrusion of expanded packing ring 58c and to maintain sealing contact with counterbore 42 of adapter 40.

Referring now to FIG. 6, a third embodiment of the present invention is shown which employs wedge assembly 80 and a smaller lower antiextrusion ring 62. New wedge assembly 80 includes a wedge ring 82 and an antiextrusion ring 84, which are larger than the previously shown rings 66, 68 between wedge ring 64 in the first and second embodiments. New wedge assembly 80 does away with a wedge ring between the antiextrusion rings and crushable follower 54. Wedge ring 82 and antiextrusion ring 84 are, in appearance, the upper and lower halves, respectively, of a square cross-sectional ring cut diagonally in two halves of a triangular cross-section. The legs enclosing the right angle of wedge ring 82 and antiextrusion ring 84 are equal in length to the radial depth of packing rings 58, and therefore fill the entire recessed portion between counterbore 42 of adapter 40 and axial wall 38 of nipple 20. The diagonal interface between rings 82, 84 fulfills the function of wedge ring 64 previously shown in the first embodiment. Along that common interface, antiextrusion ring 84 is able to slide radially outwardly, while wedge ring 82 slides radially inwardly under load conditions. The axial and radial displacement caused by thermal expansion maintains the antiextrusion enclosure of the packing ring and the sealing contact with axial wall 38 and counterbore 42 in the manner analogous to the one previously described. Frustoconical seat 36 and lower antiextrusion ring 62 are identical in form and function to those described in connection with FIG. 5 above.

Referring now to FIG. 7, a fourth embodiment of the present invention is shown which may be said to be characterized by the absence of metal spacer rings. The particular version of the fourth embodiment shown in FIG. 7, for example, employs only one packing ring 90. Ring 90 directly abuts antiextrusion ring 84, which is generally the same as the one described in connection with FIG. 6 above and adapted to cooperate with a similar wedge ring 82, as there described. The lower metal back-up ring 92 abutting graphite compound ring 90 at its downhole face is different from the previous embodiment, however. The nipple 94 of FIG. 7 has its frustoconical seat 96 tapering from the base of axial wall 98 rather than at the outer terminus of shoulder 34 as in the first embodiment. Thus, seat 96 extends across the entire radial depth of reduced diameter portion 100, back-up ring 92 abuts sat 96 and also covers the entire radial depth, being of a radial thickness equal to that of packing ring 90 and lower antiextrusion ring 84.

Yet another slightly different modification of the type of sealing arrangement shown in FIG. 7 has been employed for 3-inch seals, utilizing two graphite compound rings 90 rather than one, with both graphite compound rings abutting each other directly, having no metal spacer ring between them.

Because many varying and different embodiments may be made within the scope of the inventive concept herein taught, and because many modifications may be made in the embodiments herein detailed, it should be understood that the details described herein are to be interpreted as illustrative and not in a limiting sense.

What is claimed is the following:

1. An assembly for maintaining a seal between a first member and a second member housed within the first member, the seal being maintained at both a low temperature and upon the application of extreme heat to the exterior of the first member, comprising:
   nonmetal seal means for sealingly engaging the first and second member, said nonmetal seal means having a thermal expansion at least as great as that of the first member;
   metal seal means disposed above and below said nonmetal seal means for sealingly engaging the first and second members; and
   load maintaining means for maintaining a compressive load on said nonmetal means within a predetermined load range.

2. An assembly for maintaining a seal between a first memer and a second member housed within the first member, the seal being maintained at both a low temperature and upon the application of extreme heat to the exterior of the first member, comprising:
   nonmetal seal means for sealingly engaging the first and second member, said nonmetal seal means having a thermal expansion at least as great as that of the first member;

metal seal means disposed above and below said nonmetal seal means for sealingly engaging the first and second members; and load maintaining means for maintaining a compressive load on said nonmetal means within a predetermined load range, wherein said nonmetal seal means includes a ring of a graphite compound.

3. An assembly for maintaining a seal between a first member and a second member housed within the first member, the seal being maintained at both a low temperature and upon the application of extreme heat to the exterior of the first member, comprising:

nonmetal seal means for sealingly engaging the first and second member, said nonmetal seal means having a thermal expansion at least as great as that of the first member;

metal seal means disposed above and below said nonmetal seal means for sealingly engaging the first and second members; and load maintaining means for maintaining a compressive load on said nonmetal means within a predetermined load range, wherein said nonmetal seal means includes a plurality of graphite compound rings being separated by spacer rings.

4. The assembly of claim 3 wherein said graphite compound rings are composed of compressed wraps of ribbon-like graphite compound.

5. The assembly of claim 4 wherein said wraps have medium tightness to achieve uniform axial and radial expansion of said graphite compound rings.

6. The assembly of claim 5 wherein said graphite compound rings are compressed by applying a pressure of more than the rated working pressure to compress a graphite compound ribbon to approximately half its original height.

7. The assembly of claim 1 further including means for preserving the shape of said nonmetal seal means under compression.

8. An assembly for maintaining a seal between a first member and a second member housed within the first member, the seal being maintained at both a low temperature and upon the application of extreme heat to the exterior of the first member, comprising:

nonmetal seal means for sealingly engaging the first and second member, said nonmetal seal means having a thermal expansion at least as great as that of the first member;

metal seal means disposed above and below said nonmetal seal means for sealingly engaging the first and second members; and load maintaining means for maintaining a compressive load on said nonmetal means within a predetermined load range, wherein said load maintaining means includes a crushable metal member having alternating grooves.

9. The assembly of claim 7 wherein said nonmetal seal means includes a ring of a graphite compound and said preserving means includes an antiextrusion assembly abutting said graphite compound ring.

10. The assembly of claim 9 wherein said antiextrusion assembly includes at least one ring having a frustoconical cam surface.

11. The assembly of claim 9 wherein said antiextrusion assembly includes a first and second back-up ring abutting the uppermost side of said graphite ring, said first and second back-up rings being of triangular cross-section forming a downwardly facing V.

12. The assembly of claim 11 wherein said antiextrusion assembly further includes a wedge ring of generally trapezoidal shape extending into said V formed between said first and second annular back-up rings.

13. The assembly of claim 9 wherein said preservation means includes another antiextrusion assembly having a third and fourth back-up ring of generally triangular cross-section forming an upwardly facing V, said third and fourth back-up rings abutting that side of said graphite ring which is opposite the side abutting said first and second back-up rings.

14. The assembly of claim 13 wherein said antiextrusion assembly further includes a second wedge ring of generally trapezoidal cross-section.

15. The assembly of claim 1 further including means for compressing said nonmetal means, said metal seal means, and said load maintaining means.

16. A packing for making up a fire resistant seal between an outer telescoping member and an inner telescoping member, defining a common axis, comprising:

packing means for sealingly engaging said inner and said outer telescoping member, said packing means having a thermal expansion coefficient which is at least as great as the thermal expansion coefficient of said inner and outer telescoping members;

packing receiving means between the outer telescoping member and the inner telescoping member for slidably receiving said packing means;

upper and lower antiextrusion means on both sides of said packing means for preventing the extrusion of said packing means under compression; and load maintaining means for compressing said packing means within a predetermined load range and for maintaining such compression of said packing means within such predetermined load range upon elevating such outer telescoping member from an ambient temperature to an elevated temperature.

17. A packing for making up a fire resistant seal between an outer telescoping member and an inner telescoping member, defining a common axis, comprising:

packing means for sealingly engaging said inner and said outer telescoping member, said packing means having a thermal expansion coefficient which is at least as great as the thermal expansion coefficient of said inner and outer telescoping members;

packing receiving means between the outer telescoping member and the inner telescoping member for slidably receiving said packing means;

upper and lower antiextrusion means on both sides of said packing means for preventing the extrusion of said packing means under compression; and load maintaining means for compressing said packing means within a predetermined load range, wherein said load maintaining means includes a first cylindrical member to be received within said packing receiving means, said first cylindrical member having alternating recessed grooves along both its inner and outer radial surfaces.

18. The device of claim 16 wherein said antiextrusion means include at least one ring having a frustoconical cam surface.

19. The device of claim 16 wherein said lower antiextrusion means includes a wedge ring of generally trapezoidal shape, the base of which abuts said load maintaining means.

20. The device of claim 19 wherein said lower antiextrusion means further includes two concentric rings of triangular cross-section the hypotenuses of which abut the triangular top portion of said wedge ring.

21. The device of claim 20 wherein said packing means includes at least one compressed ring of graphite compound wrappings.

22. The device of claim 21 wherein said packing means includes a plurality of said graphite compound rings separated by spacer rings between them.

23. The device of claim 22 wherein said upper antiextrusion means includes a wedge ring of generally trapezoidal shape, the apex of which abuts the uppermost of said graphite compound rings.

24. The device of claim 23 wherein the legs of the triangular portion of said wedge ring abut the hypotenuses of two concentric back-up rings of triangular cross-section.

25. A fire resistant seal assembly housed within a wellhead between a hanger and a head, comprising:
    graphite compound seal means around the hanger for sealing with the hanger and head;
    metal-to-metal seal means disposed above and below said graphite compound means for establishing a metal-to-metal seal between the hanger and head and for preventing the extrusion of said graphite seal means;
    crushable metal means around the hanger for engagement with said metal-to-metal seal means; and
    means for compressing said graphite compound seal means, metal-to-metal seal means and crushable metal means for actuation.

26. The assembly as defined by claim 25 wherein said graphite compound seal means has a thermal expansion coefficient at least as great as that of the head.

27. The assembly as defined by claim 25 wherein said graphite compound seal means expands axially and radially around the hanger upon a temperature increase.

28. The assembly as defined by claim 27 further including spacer means for guiding the expansion of said graphite compound seal means.

29. The assembly as defined by claim 25 wherein said metal-to-metal seal means includes cam means for expanding an inner and outer metal seal ring into sealing engagement with the hanger and head.

30. The assembly as defined by claim 25 further including retention means for maintaining said graphite compound seal means, metal-to-metal seal means, and crushable metal means around the hanger.

31. The assembly as defined by claim 25 wherein said metal-to-metal seal means includes a metal seal ring having a cam surface engageable with the hanger for metal sealing engagement with the hanger and head.

32. The assembly as defined by claim 25 wherein said crushable metal means has some residual resilience and establishes a predetermined load.

33. The assembly of claim 2 wherein said graphite compound ring is composed of compressed wraps of ribbon-like graphite compound.

34. The assembly of claim 33 wherein said wraps have medium tightness to achieve uniform axial and radial expansion of said graphite compound ring.

35. The assembly of claim 34 wherein said graphite compound ring is compressed by applying a pressure of more than the rated working pressure to compress a graphite compound ribbon to approximately half its original height.

* * * * *